United States Patent [19]

Thomas et al.

[11] Patent Number: 5,018,904
[45] Date of Patent: May 28, 1991

[54] SEA-BED SUPPORT DEVICE FOR THE LEGS OF A SELF-ELEVATING OIL-RIG PLATFORM

[75] Inventors: Pierre A. Thomas, Puteaux; Guy R. Delamare, Herblay, both of France

[73] Assignee: Technic Geoproduction, Paris, France

[21] Appl. No.: 380,600

[22] Filed: Jul. 17, 1989

[30] Foreign Application Priority Data

Jul. 28, 1988 [FR] France .................. 88 10216

[51] Int. Cl.⁵ ............................................. E02B 17/08
[52] U.S. Cl. .................................... 405/196; 405/204; 405/226
[58] Field of Search ............... 405/196, 197, 198, 199, 405/200, 201, 224, 226

[56] References Cited

U.S. PATENT DOCUMENTS

| 2,399,656 | 5/1946 | Armstrong | 405/200 X |
| 2,600,761 | 6/1952 | Halliburton | 405/197 |
| 2,941,369 | 6/1960 | Quirin | 405/200 |
| 3,036,438 | 5/1962 | Sims | |
| 3,118,283 | 1/1964 | True et al. | 405/200 |
| 4,859,117 | 8/1988 | Brandi et al. | 405/224 |

FOREIGN PATENT DOCUMENTS

| 1484525 | 9/1969 | Fed. Rep. of Germany | 405/200 |
| 2019985 | 11/1971 | Fed. Rep. of Germany | 405/196 |
| 2354959 | 1/1978 | France . | |
| 1296929 | 11/1972 | United Kingdom . | |
| 1407653 | 9/1975 | United Kingdom | 405/226 |
| 1457170 | 12/1976 | United Kingdom . | |

Primary Examiner—Dennis L. Taylor
Attorney, Agent, or Firm—Wenderoth, Lind & Ponack

[57] ABSTRACT

A support device on the sea-bed for legs of a self-elevating oil-rig platform are characterized in that it comprises an individual and independent shoe (3) intended to be fixed on the lower end of the leg (2) and fitted with a detachable and adjustable locking means (20), for fitting rigidly on the said lower end of the leg (2).

15 Claims, 16 Drawing Sheets

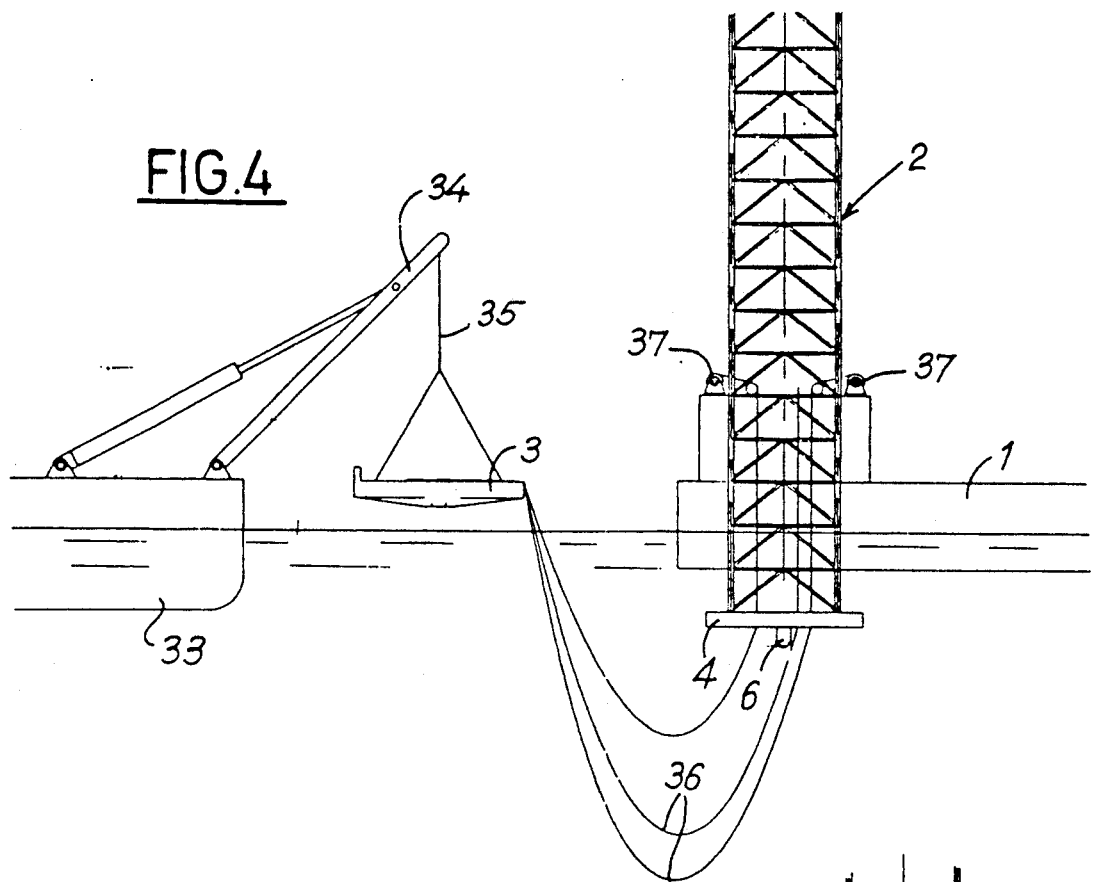
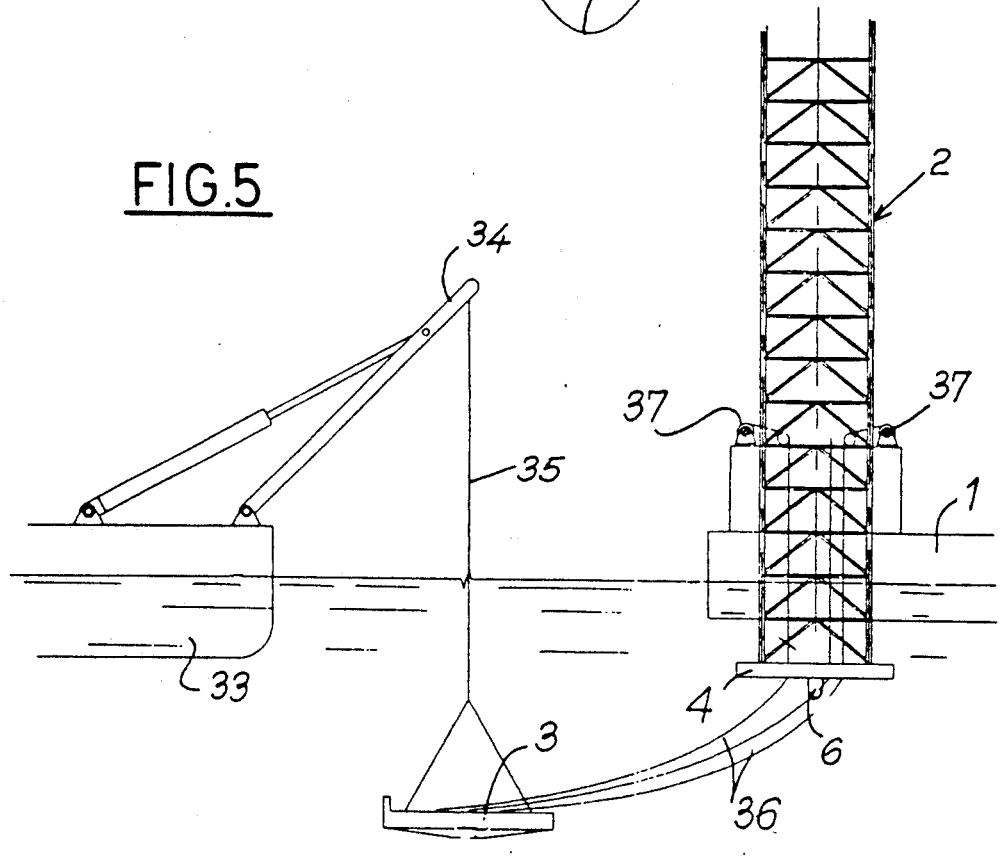

SEA-BED SUPPORT DEVICE FOR THE LEGS OF A SELF-ELEVATING OIL-RIG PLATFORM

BACKGROUND OF THE INVENTION

The present invention relates to self-elevating platforms for oil-drilling and relates more particularly to production-drilling platforms for production operations at sea. Self-elevating platforms for carrying out drilling at sea were used until recently for depths less than 100 m.

However, to increase the field of application of this type of platform, some constructors are putting forward concepts which relate to standard architecture of self-elevating platforms in order to reach depths greater than 100 to 110 m. This results in a considerable increase in the leg and body dimensions and of the displacement for towing.

In this case, lattice type legs result, or which the distance between the members can be greater than 20 m.

The increase in the leg dimensions results in a considerable increase in weight, in a higher position of the center of gravity when towed, and therefore in a loss of stability as well as greater hauling forces when being towed.

Over and above the economic aspect, this makes difficult the moving of such a platform from one drilling site to another.

Drilling operators prefer to work with self-elevating platforms, which are "fixed" platforms when in the elevated drilling position on their legs, rather than with semi-submersible platforms which are mobile platforms.

This is why other constructors propose to move the boundary of use of the self-elevating platforms up to depths of 130/150 m and beyond, by placing an individual and independent raising block between the leg of the platform and the sea-bed in order to increase the installation depth of the platform.

However, a self-elevating platform does not work at the maximum depth that it can reach and a platform designed for a depth of 130/150 m is often used at depths which are less than this.

In this type of platform, the ends of the legs have feet for resting on the blocks which are no longer adapted for resting directly on the sea-bed.

SUMMARY OF THE INVENTION

The object of the invention is to enlarge the field of operation for self-elevating platforms usually provided with feet for resting on blocks.

Therefore its subject is a device for supporting on the sea-bed the legs of self-elevating oil-rig platforms, characterized in that it includes an individual and independent shoe provided with an upper plate by which the shoe is intended to be connected to the leg of the platform, a lower plate which rests on the sea-bed and a detachable and adjustable locking arrangement for rigidly fixing the show on the lower end of the leg.

The subject of the invention is also a self-elevating platform for drilling at sea including a body fitted in a movable and lockable position on legs intended to rest on the sea-bed, characterized in that each leg is provided with a separable shoe of the type defined above, fitted on the lower end of the said leg and intended to be placed between the leg and the sea bed in the working position of the platform.

BRIEF DESCRIPTION OF THE DRAWINGS

The invention will be better understood with the help of the description which follows, given only as an example and made with reference to the attached drawings, in which:

FIGS. 4 to 7 are schematic views showing diferent stages for positioning a shoe for resting on the sea-bed on one leg of the platform;

DETAILED DESCRIPTION OF THE PREFERRED EMBODIMENTS

Figure 1:
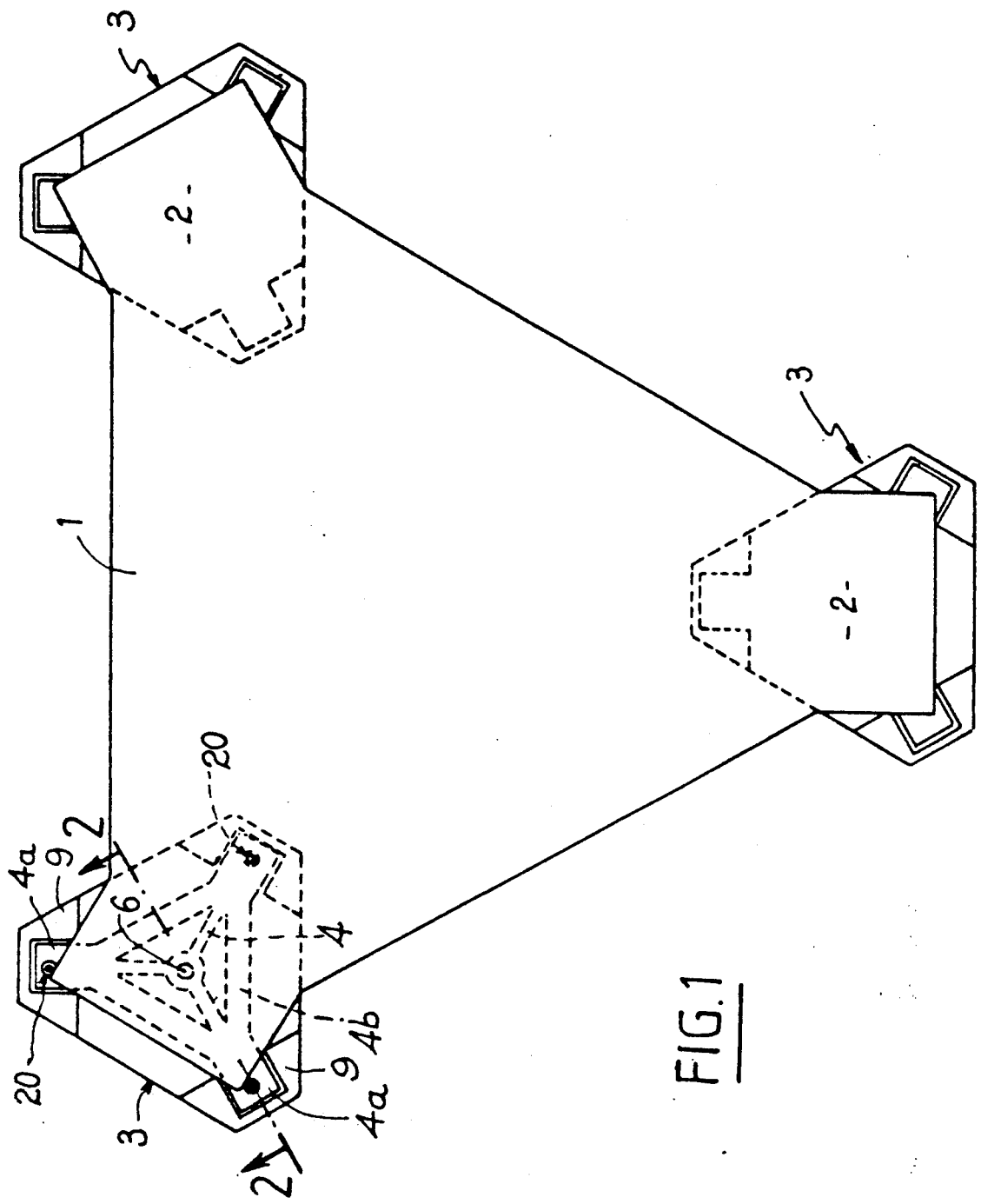
FIG. 1 is a schematic plane-view of a self-elevating platform of which the legs are provided with a device according to the invention.

The self-elevating platform shown in FIG. 1 principally comprises a body 1 of a generally triangular form fitted a movable position on three vertical legs 2 intended to rest on the sea bed when the platform is in the working position.

The platform is further provided with a device for moving the body 1 with respect to the legs 2 and means for locking the body with respect to the legs 2 (not shown).

The length of each of the legs of the platform is such that this platform can normally be positioned on sites at depths of about 100 to 110 m.

In order to increase the possibilities of exploitation of this type of platform, the latter can be provided either with blocks to increase the working depth or, according to the invention, with shoes 3 when it is not provided with raising blocks.

Each of the legs 2 has a triangular section and it is constituted by a lattice of metal girders. It finishes at the lower part in a foot 4, which, in the present example, has the form of an equilateral triangle, the apices of which are provided, in the axis of the corresponding height, with a branch 4a.

Each of the feet 4 is made, for example, of machine-welded plates and welded to the upright 5 of the corresponding leg.

Furthermore, each foot 4 includes a centering piece 6 at its center connected to the branches 4a by struts 4b.

Figure 2:
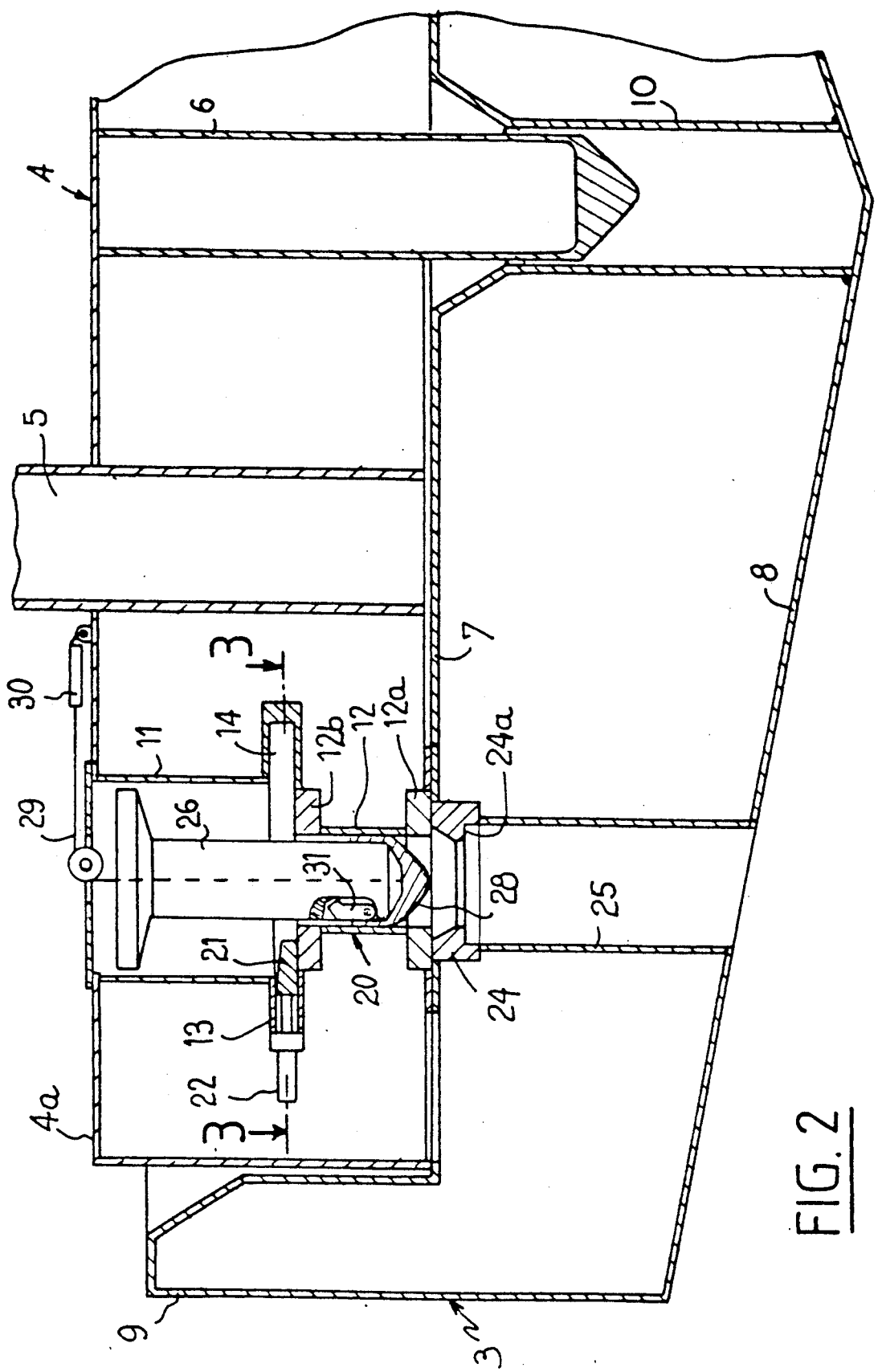
FIG. 2 is a partial sectional view on line 2—2 of FIG. 1.

As shown in FIGS. 1 and 2, a shoe 3 is fixed on the foot 4 of each leg, formed by an upper plate 7 receiving the foot 4 and joined to a lower plate 8 intended to rest on the sea bed. Each shoe 3 also has the form of an equilateral triangle the apices of which are truncated and each provided with a shoulder 9 forming a housing complementary in form to the branches 4a of the foot and intended to receive the branches.

Each foot 3 comprises a housing 10 at its center, the upper part of which is widened so as to facilitate the introduction of the centering piece 6 in the housing 10 when the shoe 3 is placed on the foot 4.

The fixing of the shoe 3 on the foot 4 is ensured by a locking system given the reference 20 and positioned on each branch 4a of the foot 4.

With reference to the FIGS. 2 and 3, one locking system will now be described, the other locking systems being identical.

To this effect, each branch 4a comprises a vertical well formed on the one hand by a first tube 11 which extends from the upper wall of the branch to approximately half the height of the branch, and on the other hand, along the axis of the first tube 11, by a second tube 12 of a smaller diameter than the first tube.

The second tube 12 is provided with a lower collar 12a welded in an opening provided in the lower wall of the foot 4 and an upper collar 12b with an outer diameter approximately equal to the diameter of the firts tube 11.

Figure 3:
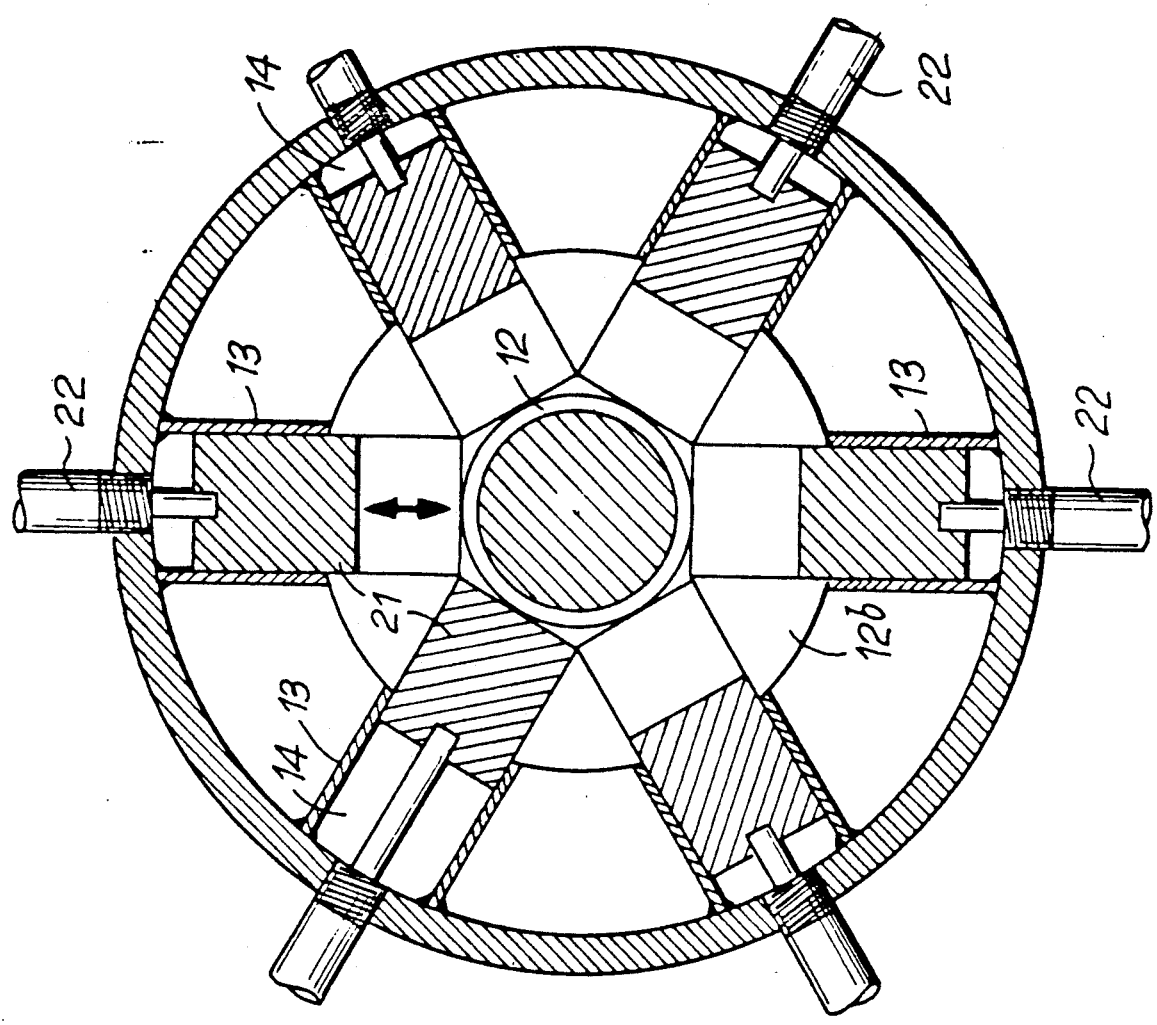
FIG. 3 is a sectional view on the line 3—3 of FIG. 2.

The upper face of the collar 12b and the lower edge of the first tube 11 form a space and are joined together by the plates 13 which form housings 14 perpendicular to the axis of the tubes 11 and 12 and evenly distributed at an angle of 60° around the tubes (FIG. 3). The system therefore comprises six housings 14.

In each of these housings 14 is positioned a block 21 in the form of a wedge, which slides on the upper face of the collar 12b and which moves in a direction perendicular to the axis of the tubes 11 and 12, under the action of a control device constituted for example by a screw-jack 22, between a locked position and an unlocked position as will be seen later.

In FIG. 3, one of the blocks 21 is shown in locked position.

In the axis of the tubes 11 and 12, of the foot 4, the upper plate 7 of the shoe 3 has an opening in which a ring 24 is fixed, provided internally with a projection 24a, which is extended by a tube 25.

A lock rod 26 moves inside the tubes 11 and 12, which comprises an anvil or flange member 27 at its upper end and an independent and movable socket 28 at its lower end. This socket 28 is joined by a cable 29, passing through the lock rod 26, to a traction device 30 constituted for example by a screw-jack or a winch.

In addition, the lock rod 26 is also provided, near its lower end, with several evenly distributed tilting catches 31, each operated for example by a leaf spring 32.

Figure 6:
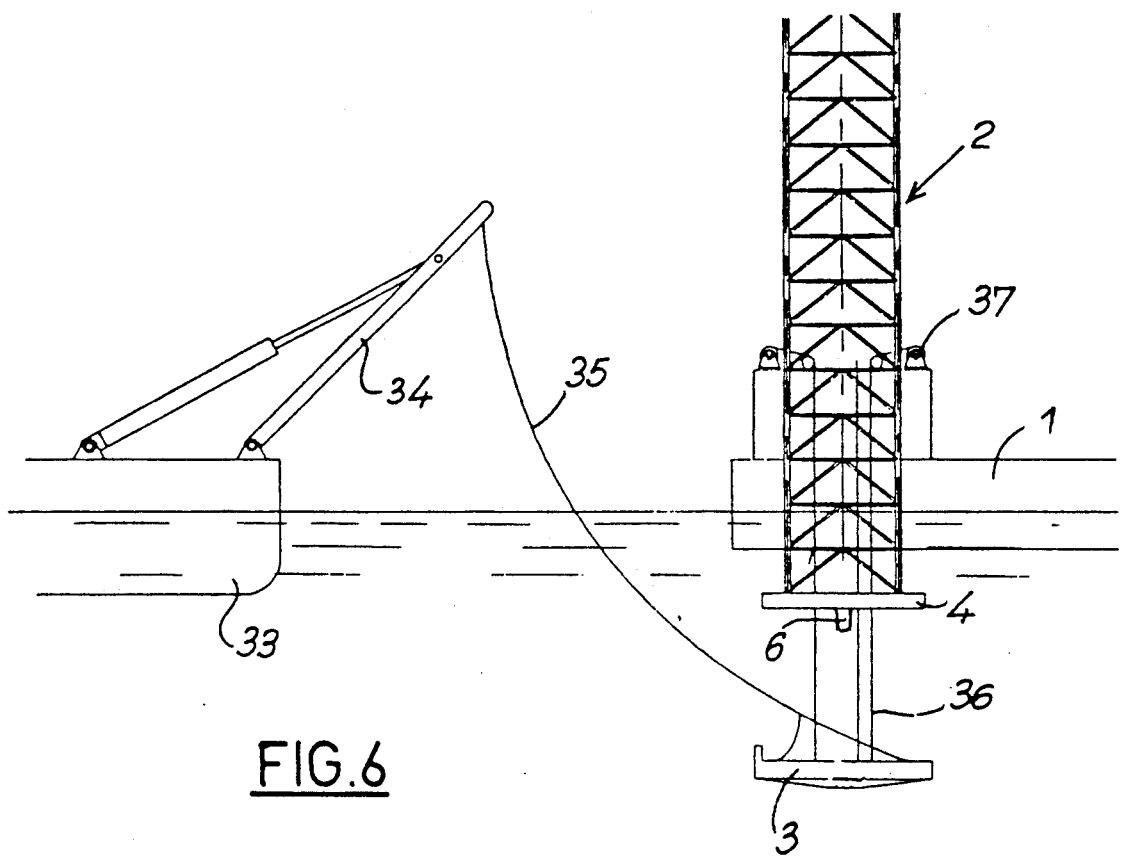
Figure 7:
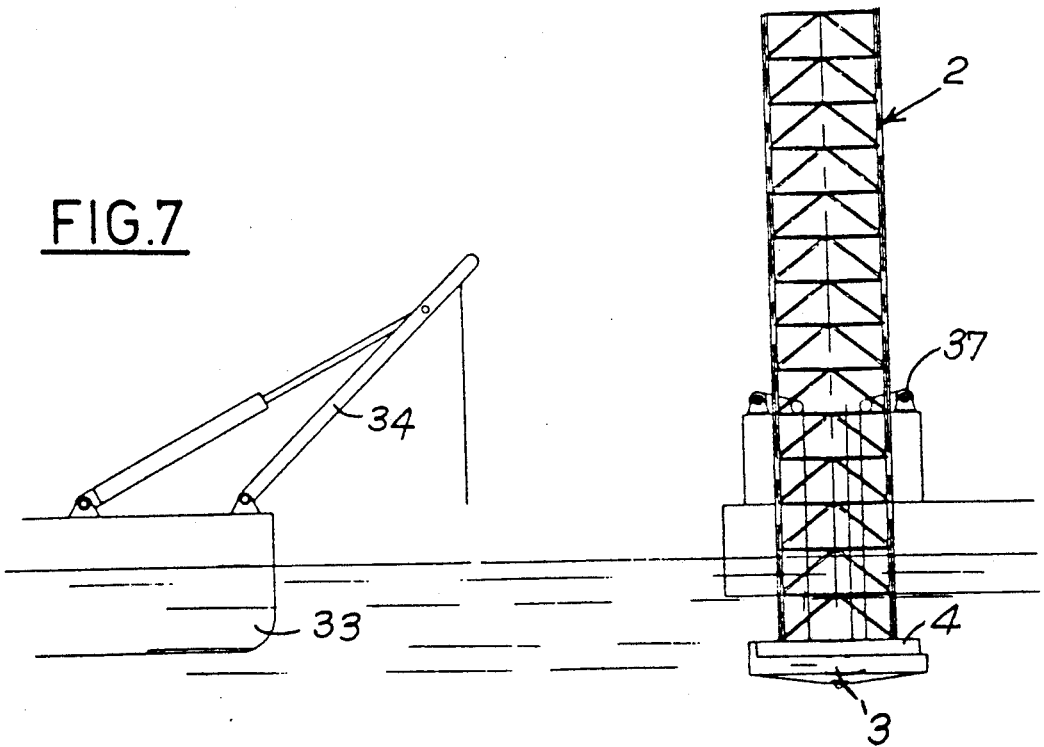

The positioning of the shoes on the feet of the platform is carried out in the following manner (FIGS. 5 to 7).

As one can see from FIG. 4, the legs 2 of the platform extend completely above the body 1. The shoes are brought by a boat 33 and one shoe 3 is suspended from a crane 34 by a rope 35. Furthermore, the shoe 3 is also attached to platform ropes 36 connected to winches 37.

The shoe 3 is lowered into the water, then the shoe is pulled by the winches 37 and the ropes 36 so as to bring it progressively under the foot 4. Then, after having detached the ropes 35 and still using the winches 37 and the ropes 36, the shoe 3 is positioned on the foot 4. The centering plug 6 ensures the centering by entering into the housing 10.

The locking of the shoe 3 on to the foot is carried out in the following manner.

Figure 8:
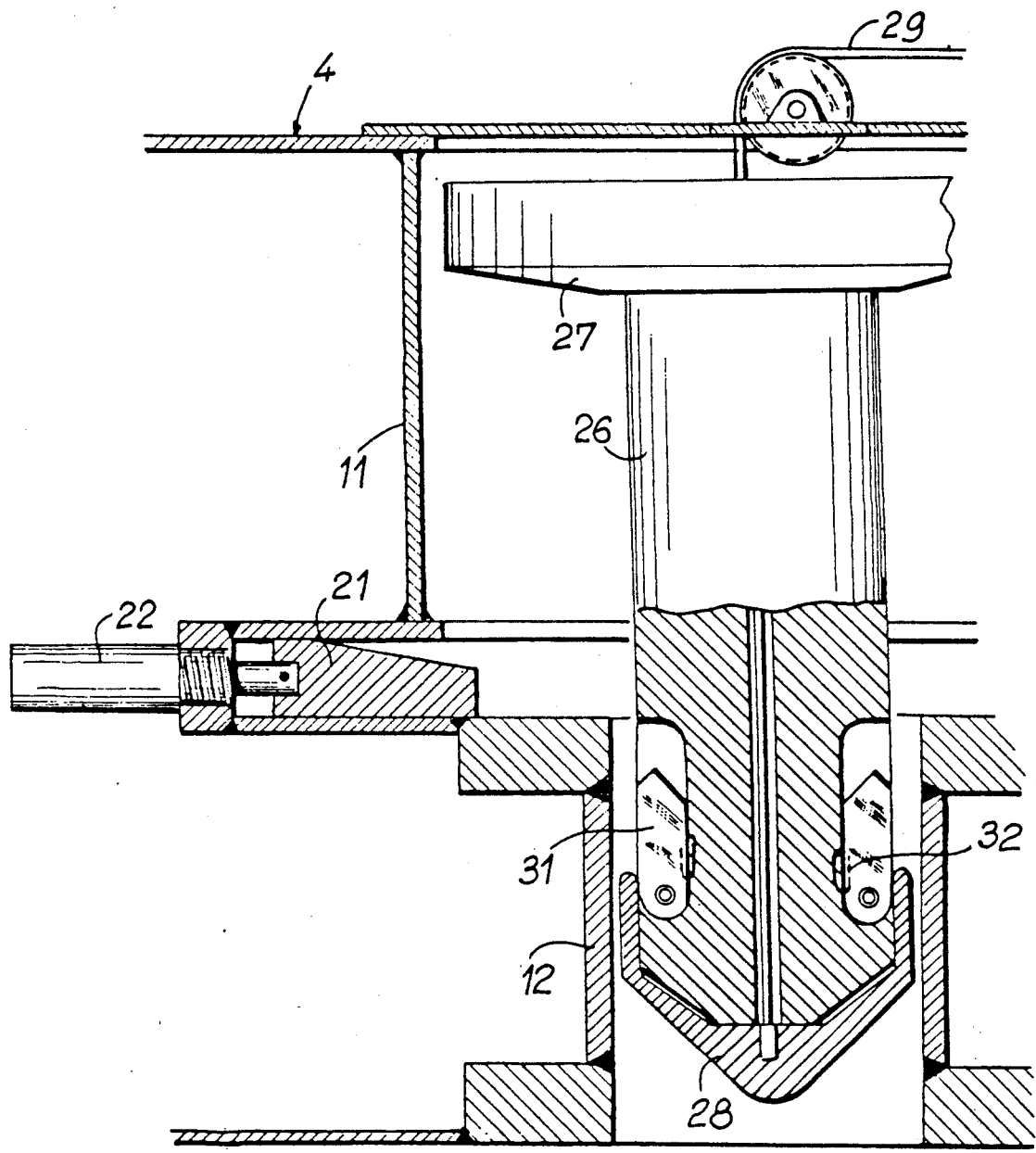
FIGS. 8 to 11 are sectional views showing different stages of locking the shoe, which will rest on the sea-bed, on one leg of the platform.

As can be seen in FIG. 8, when the shoe is being positioned, the lock rod 26 is kept in the raised position by the cable 29 and the traction device 30. The socket 28 supports the rod 26 and keeps the catches 31 retracted. Also, the blocks 21 are in the retracted position.

Figure 9:
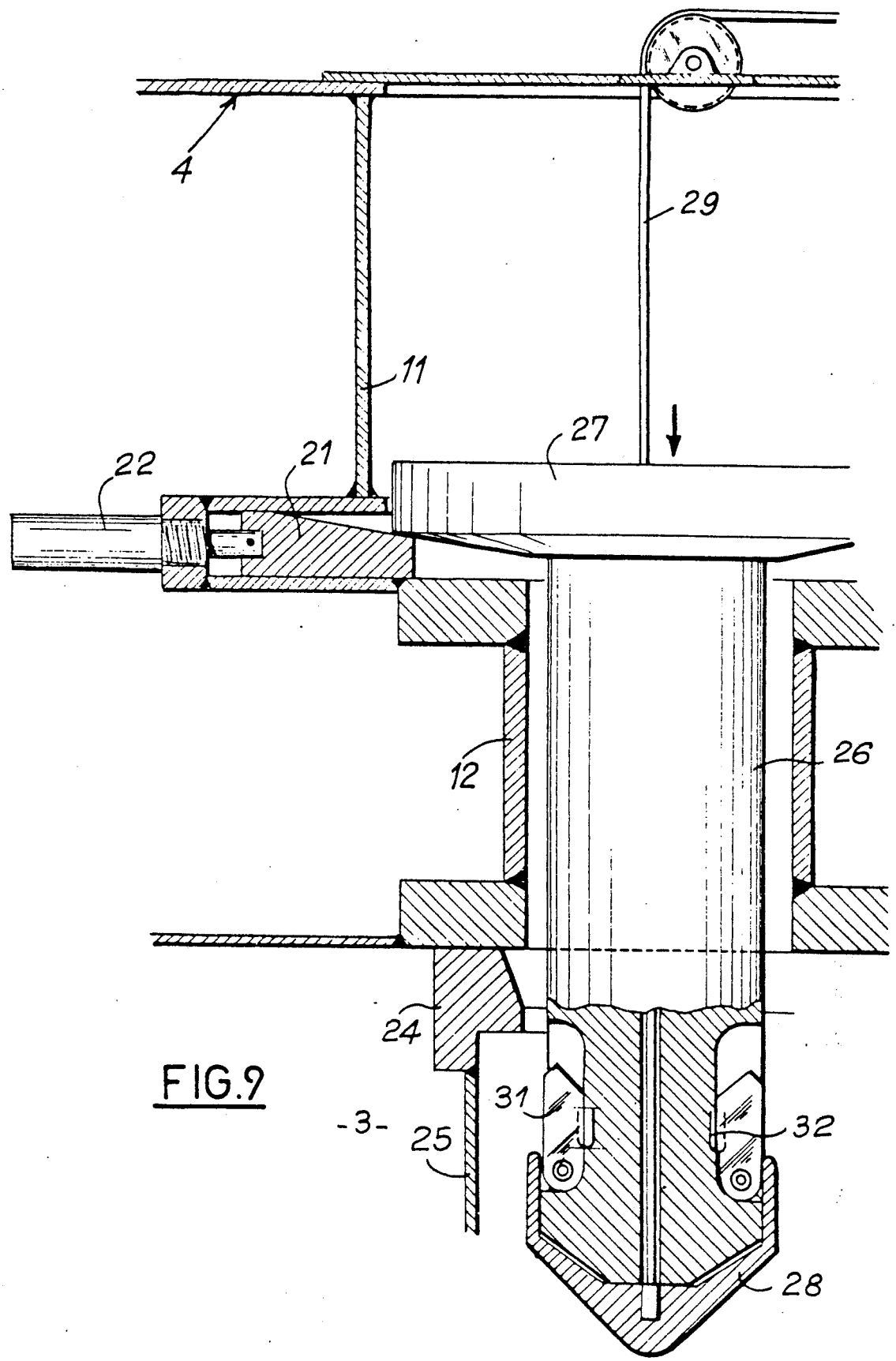
Figure 10:
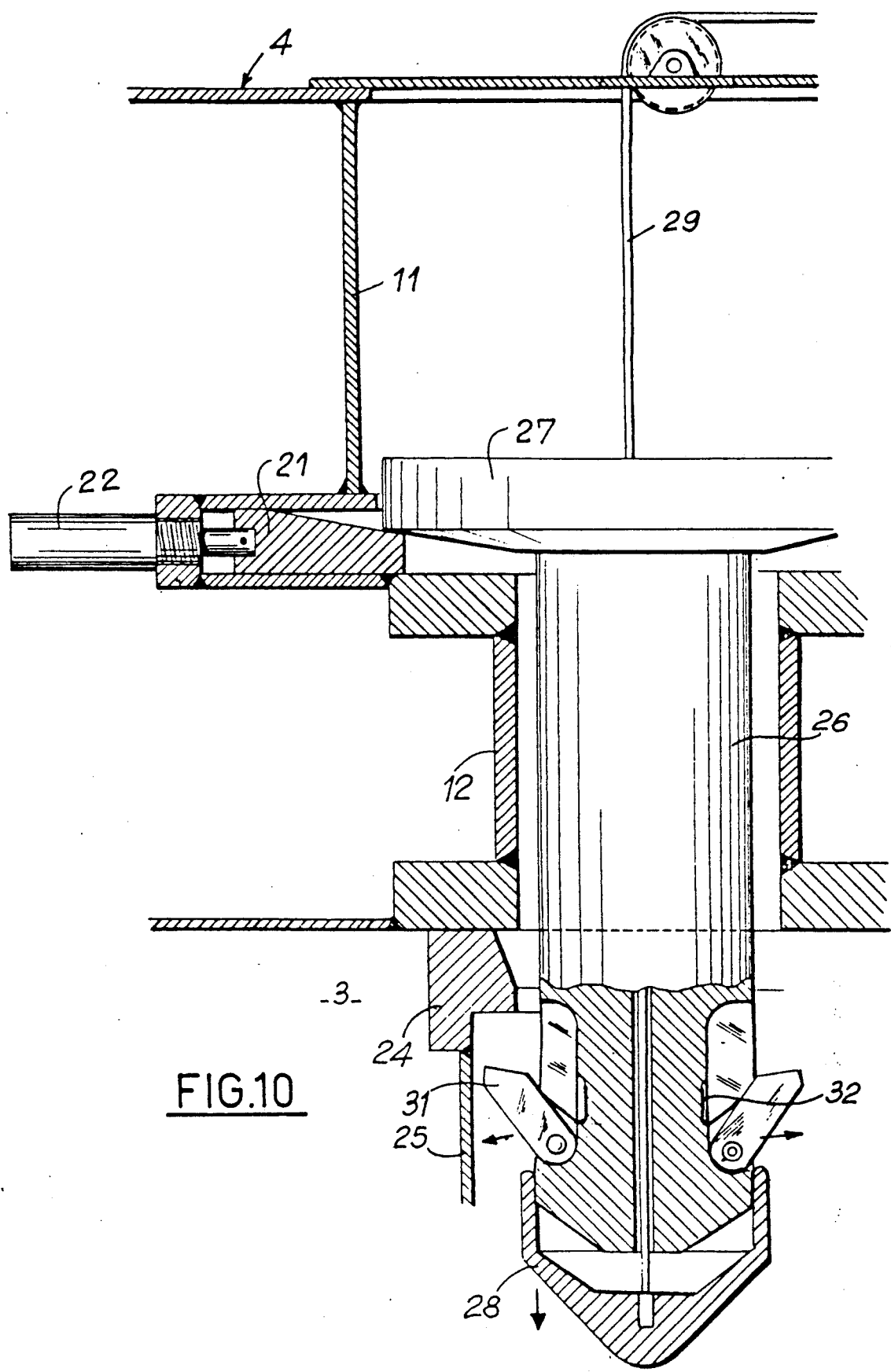

Once the positioning of the shoe 3 under the foot 4 has beenn achieved, the locking is carried out by lowering each lock rod 26 into the tube 12 of the foot and into the tube 25 of the shoe in such a way that the anvil 27 of each rod 26 comes to rest on the blocks 21 (FIG. 9). Then, the cable 29 is further slackened so that the socket 28 moves away from The end of the rod 26, thus freeing the catches 31 which open out by the action of the plate-spring 32 (FIG. 10).

Figure 11:
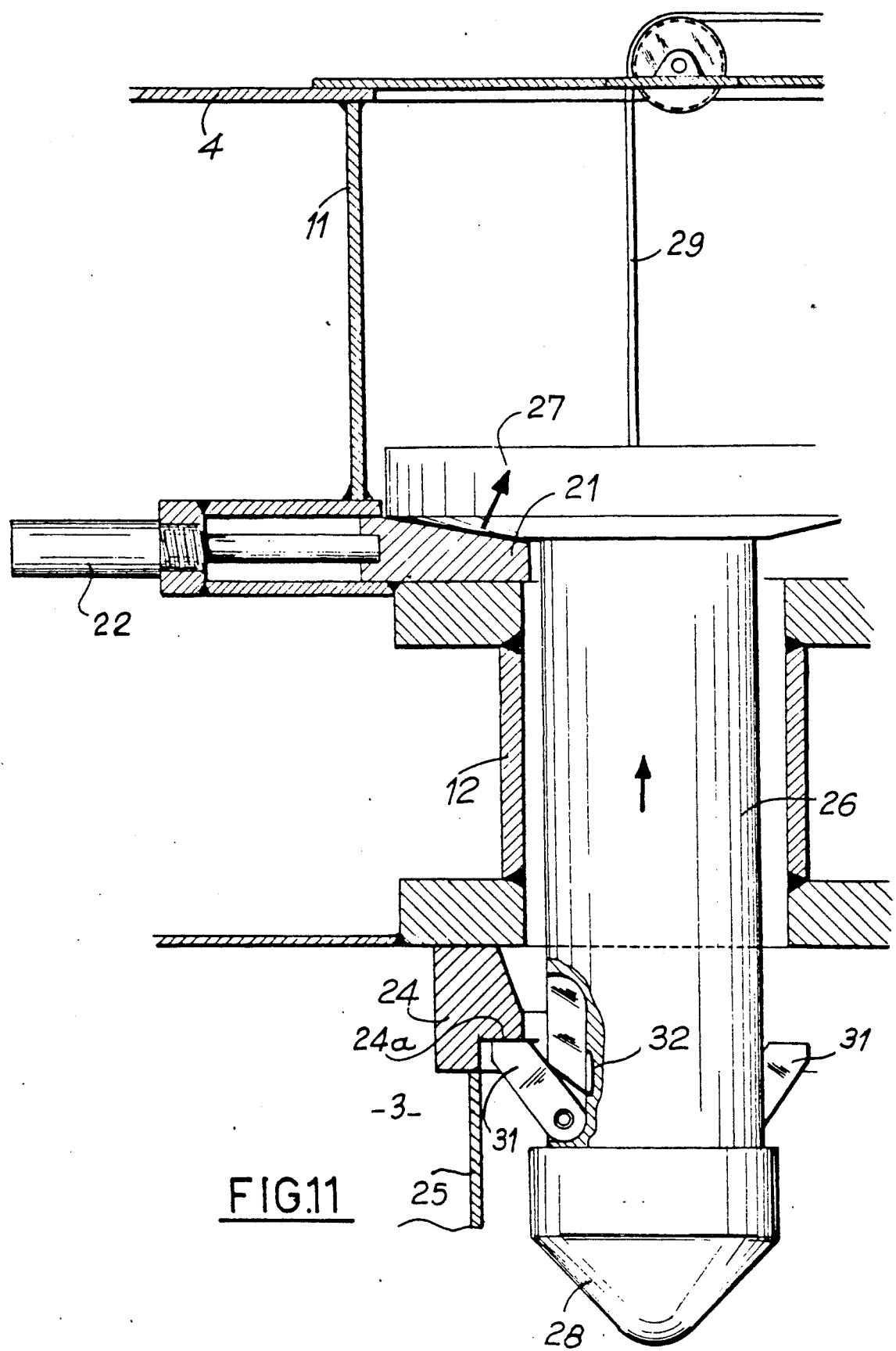

Finally under the action of the screws-jacks 22, the blocks 21 in the form of a wedge move perpendicularly to the axis of the rod 26 and raise the said rod 26 by means of the anvil 27 so that the catches 31 are applied against the lower edge 24a of the ring 24 (FIG. 11).

Thus under the wedging effect exerted by the blocks 21, the group of lock rods 26 keeps the shoe 3 applied against the foot 4 and interlocks the whole.

Figure 12:
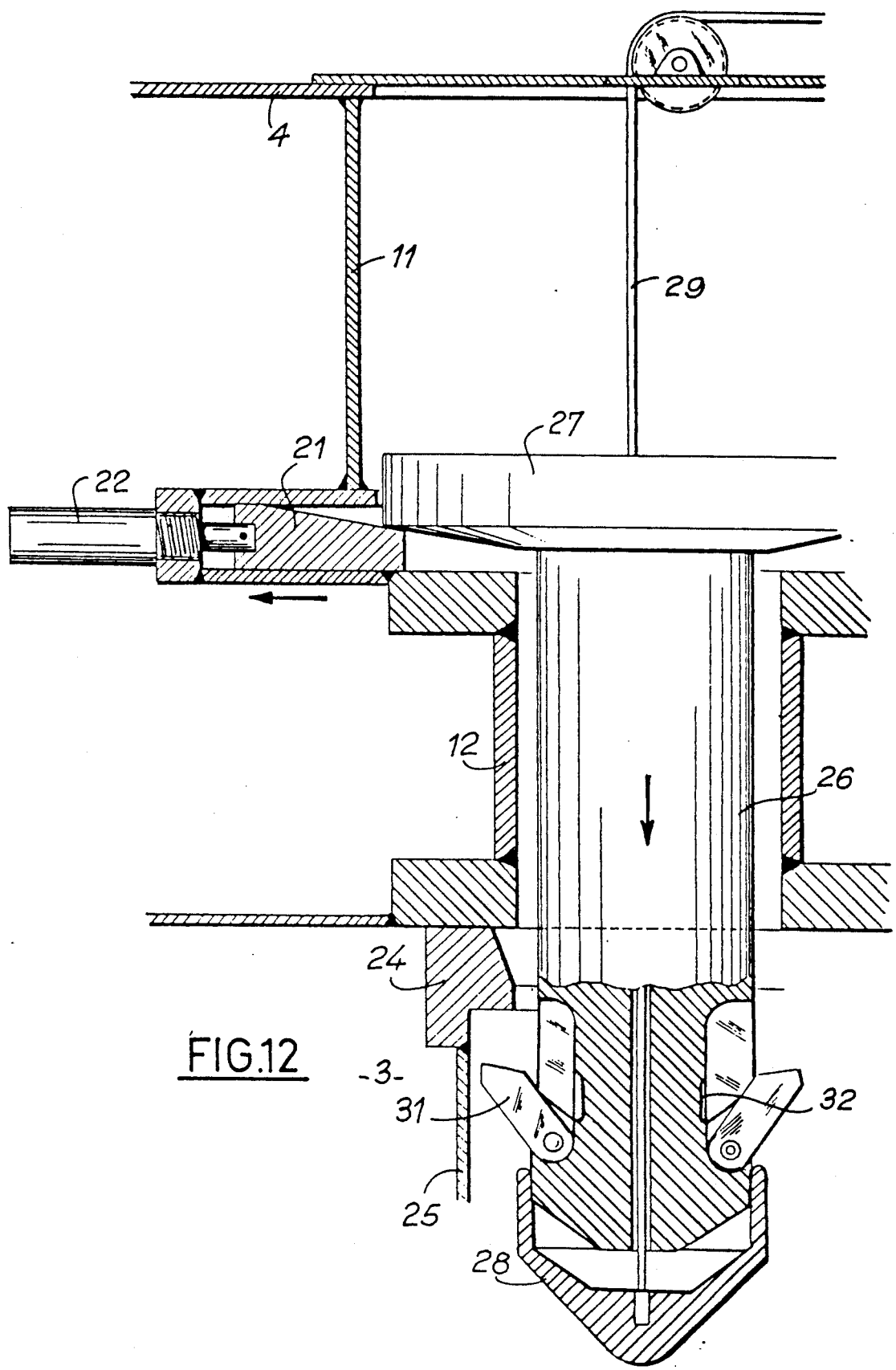
FIGS. 12 to 14 are sectional views showing different stages of unlocking the shoe, from one leg of the platform.

The operation is repeated for each foot and thus the legs of the platform are adapted to rest directly on the sea bed.

unlocking is achieved by bringing the blocks 21 into their initial position by the jack-screws 22, which on the one hand causes the lowering of the lock rod under its own weight and on the other hand disengages the catches 31 from the ring 24. (FIG. 12).

Figure 13:
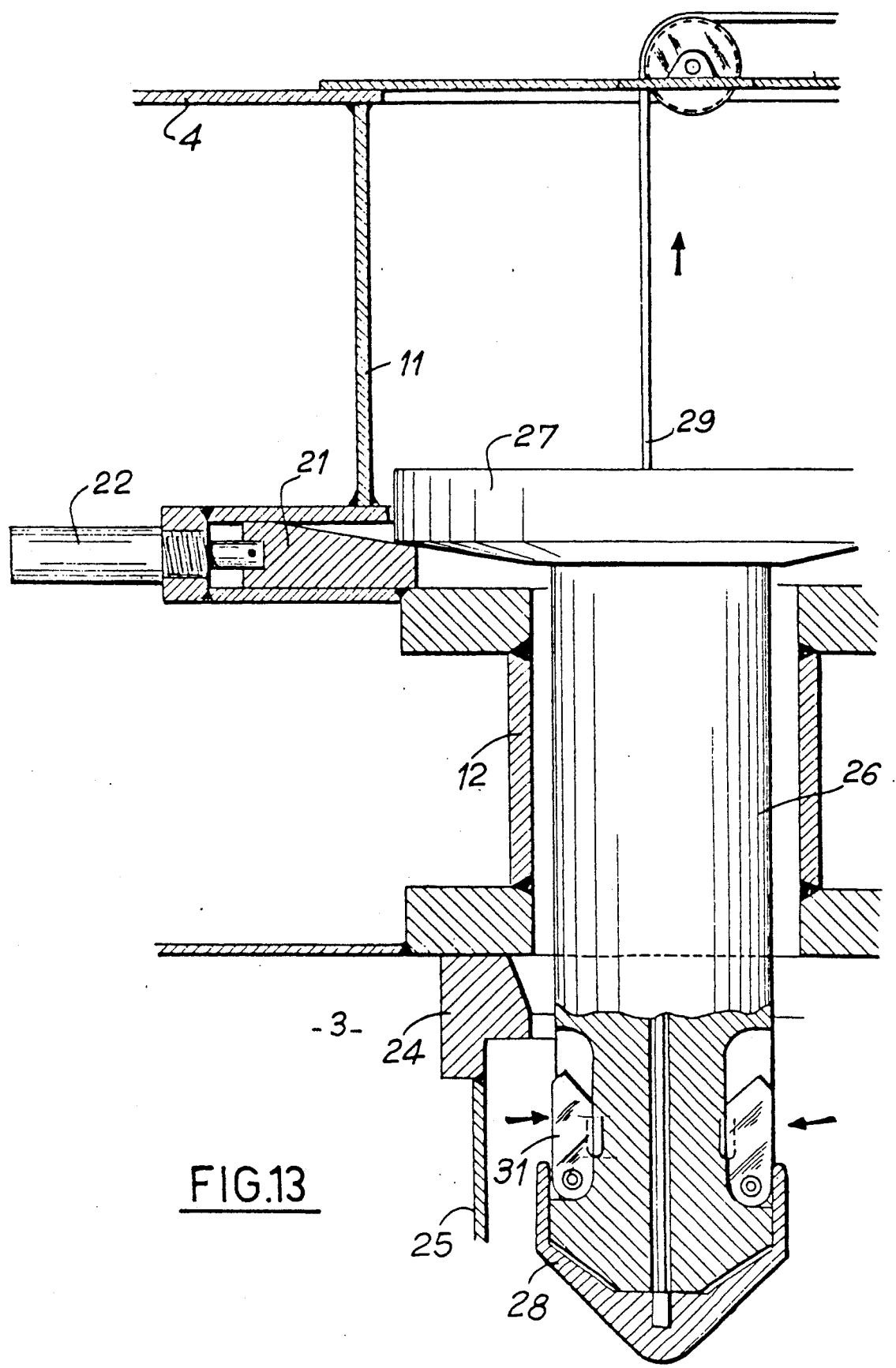

Then the winch 30 pulls on the cable 29 in such a way that the socket 28 is applied on the end of the rod 26 and retracts the catches 31 (FIG. 13).

Figure 14:
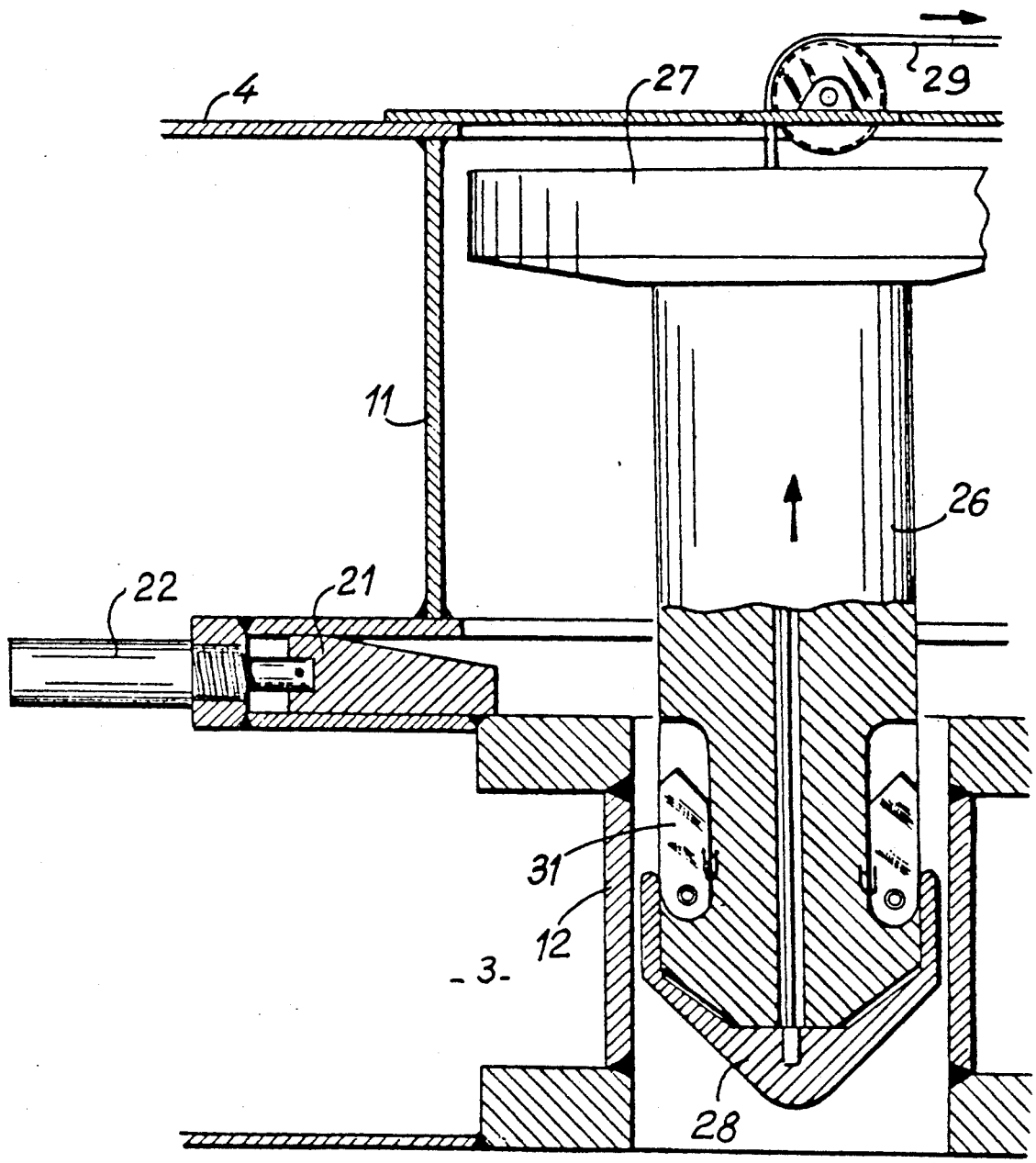

After that, it is necessary only to raise all the rods 26 and the shoe is thus released from the foot 4 (FIG. 14).

Figure 15:
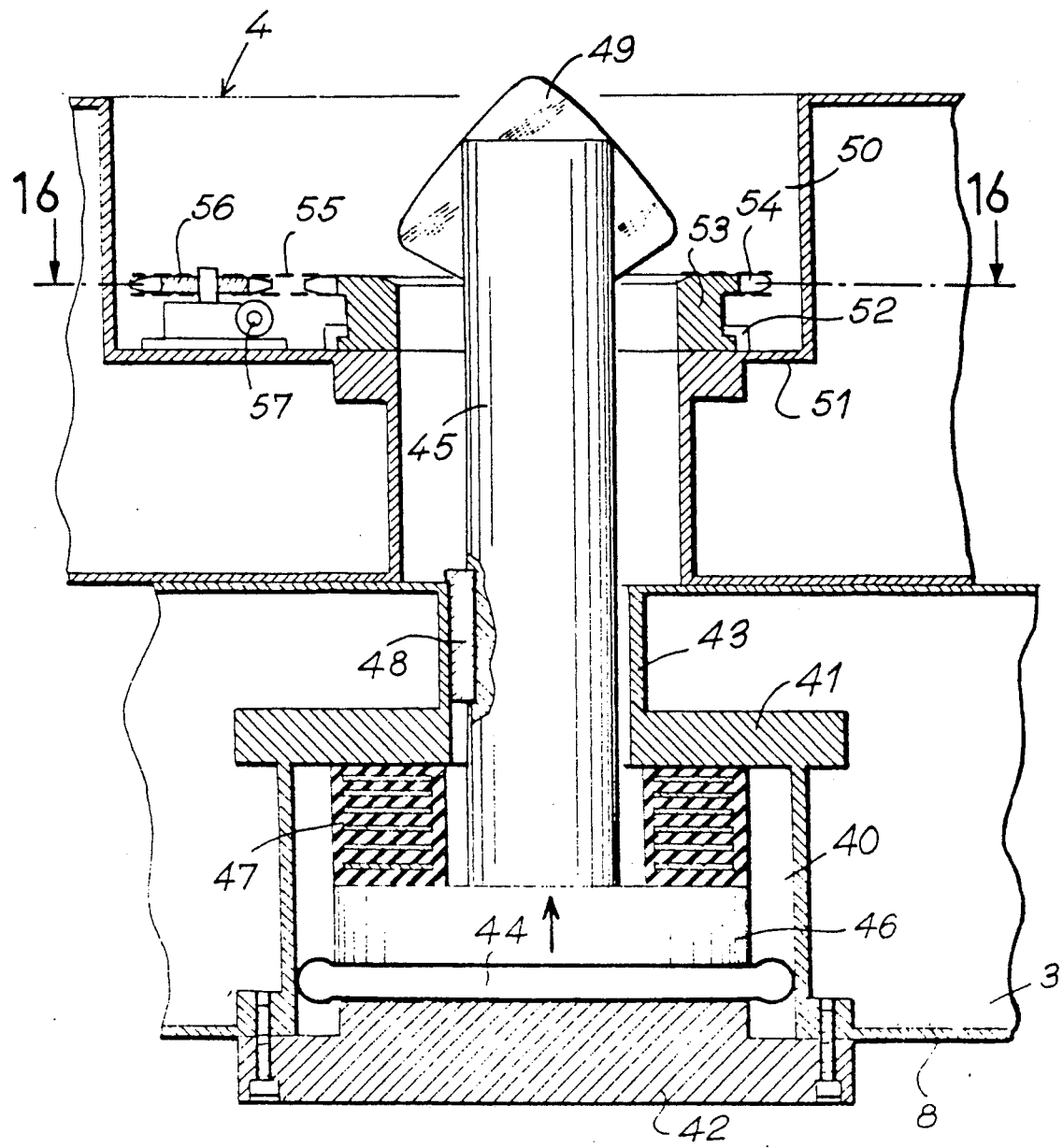
FIG. 15 is a partial sectional view of a varying embodiment of the shoe, in an unlocked position on one leg of the platform.
Figure 16:
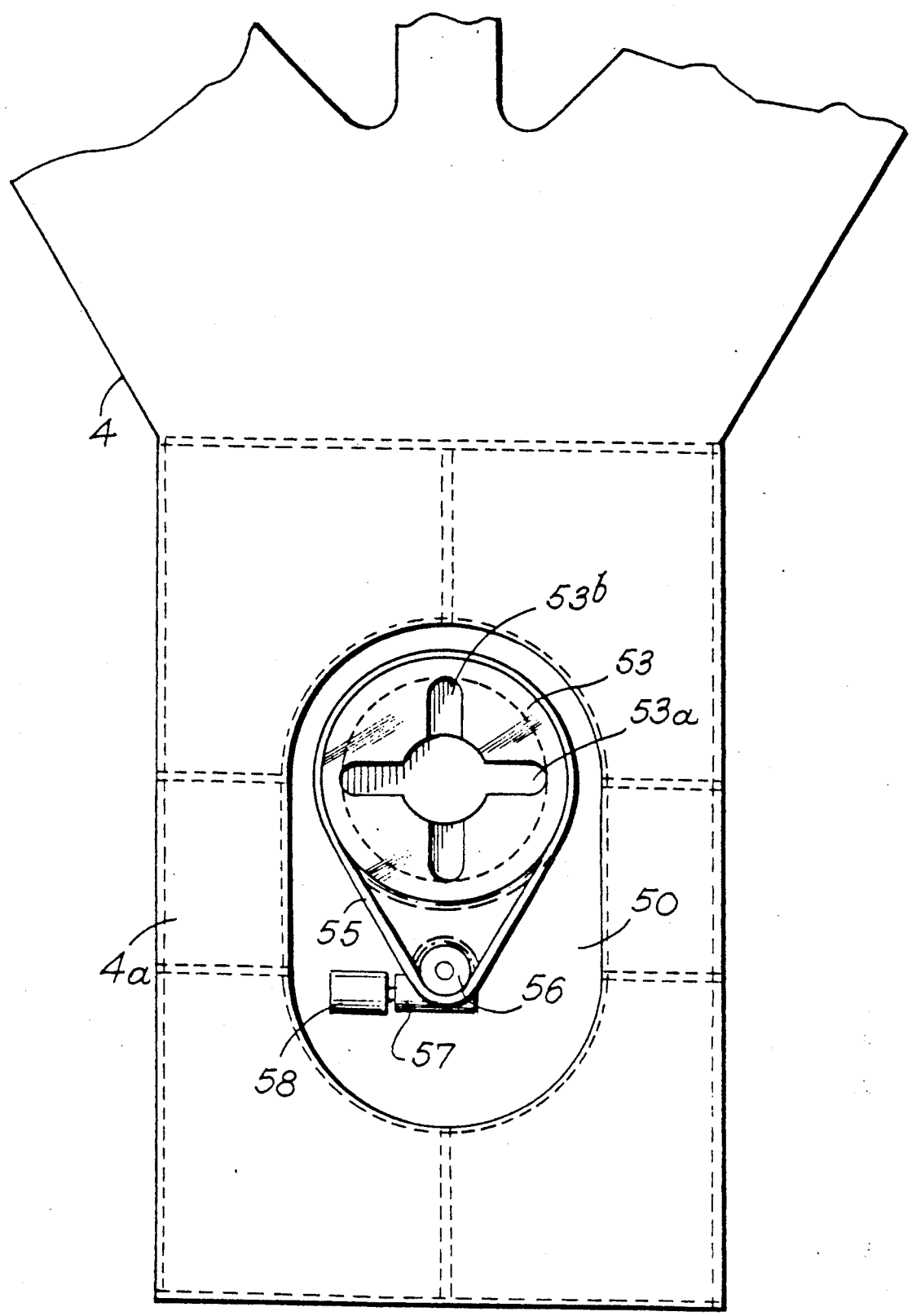
FIG. 16 is a sectional view on line 16—16 in FIG. 15.
Figure 17:
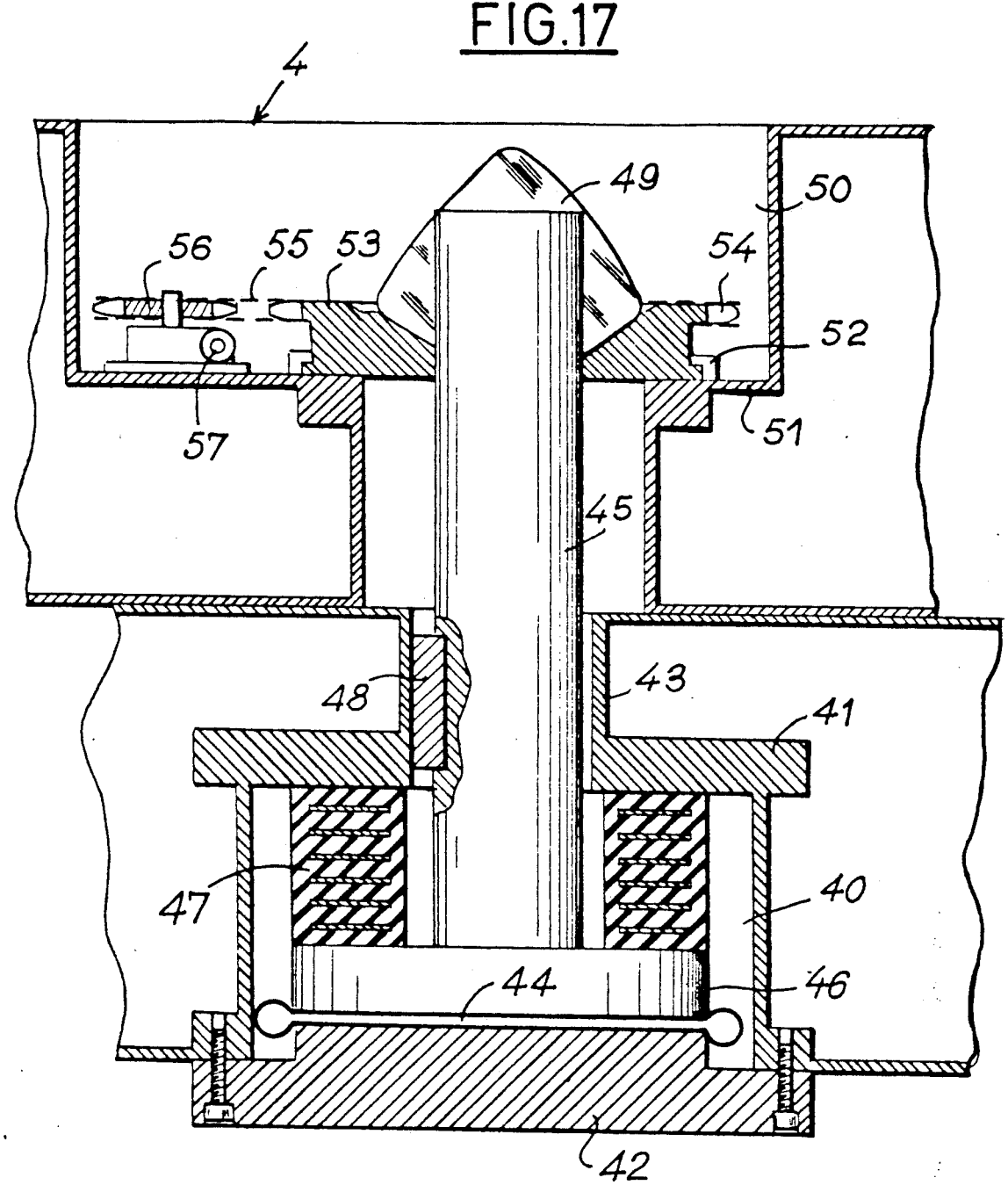
FIG. 17 is view similar to that of FIG. 15 in a locked position.

According to a variation represented in FIGS. 15 to 17, the lock rod is in one piece with the shoe 3.

To this effect, the shoe 3 comprises, at the level of each branch of the foot 4, a cylindrical housing 40 defined at its upper part by a plate 41 provided with a central opening and closed at its lower part by a cap 42 fixed on the lower plate of the shoe 3. A tube 43 is fixed on the central opening of the plate 41, the tube opening through the upper plate of the shoe 3.

In the housing 40 and resting on the shoe 42 a flat jack 44 is arranged with a small travel, which supports a lock rod 45 having for this purpose, at its lower end, a shoulder 46. An annular elastic block 47 is positioned between the shoulder 46 and the upper plate 41 of the housing 40 and surrounds the lock rod 45.

This block is advantageously constituted by a stack of elastic washers and rigid, for example metallic, washers, stuck together.

This lock rod 45 is blocked against rotation by a key 48 arranged in the tube 43 and has a crosswise rib 49 at its upper end.

Each branch of the foot 4 is also provided, in the axis 40 of the housing of the shoe 3, with an internal housing 50 emerging on both sides of the foot. This housing 50 includes a flat surface 51 on which a nut 53 is mounted, pivoting on a guiding washer 52.

The nut or blocking device 53 is provided with notches 54 around its edge, which engage with a chain 55 driven in rotation by a sheel 56. This notched wheel 56 is driven by a worm-pinion 57 which is itself driven by a motor-reducer 58 (FIGS. 15 and 16).

As can be seen in FIG. 16, the nut 53 includes, on the one hand, an aperture 53a having a form complementary to the ribbed end of the rod 45 and, on the other hand, at 90° with respect to this aperture, an indentation 53b also having a form complementary to the end of the said rod.

The locking of the shoe below the foot is carried out in the following manner.

First, as in the previous variant, the shoe 3 is positioned below the foot 4 in such a way that the rod 45 enters into the housing 50 and that its end passes through the aperture 53a of the nut 53 which has previously been turned to this position.

Then, the flat jack 44 is inflated which compresses the elastic block 47 and raises the rod 45 so that the rib 49 of the rod passes through the aperture 53a.

Under the action of the motor-reducer 58, of the worm-pinion 57, of the pinion 56 and of the chain 55, the nut 53 pivots through 90° so that the indentations 53b are positioned above the rib 49.

Finally, the pressure in the jack 44 is released and, by the action of the previously compressed elastic block 47, the rod 45 descends and the rib 49 is lodged in the identation 53b of the nut 53 (FIG. 17).

Locking has therefore been achieved, the shoe 3 and the foot 4 being thus joined firmly.

The operation is repeated for each foot and the legs of the platform are adapted to rest directly on the sea-bed.

Furthermore, the foot 4 and the shoe 3 are fitted with a pressurized fluid ejection system enabling the expulsion of the sand and sludge and avoiding a suction effect when the shoe is lifted.

Figure 18:
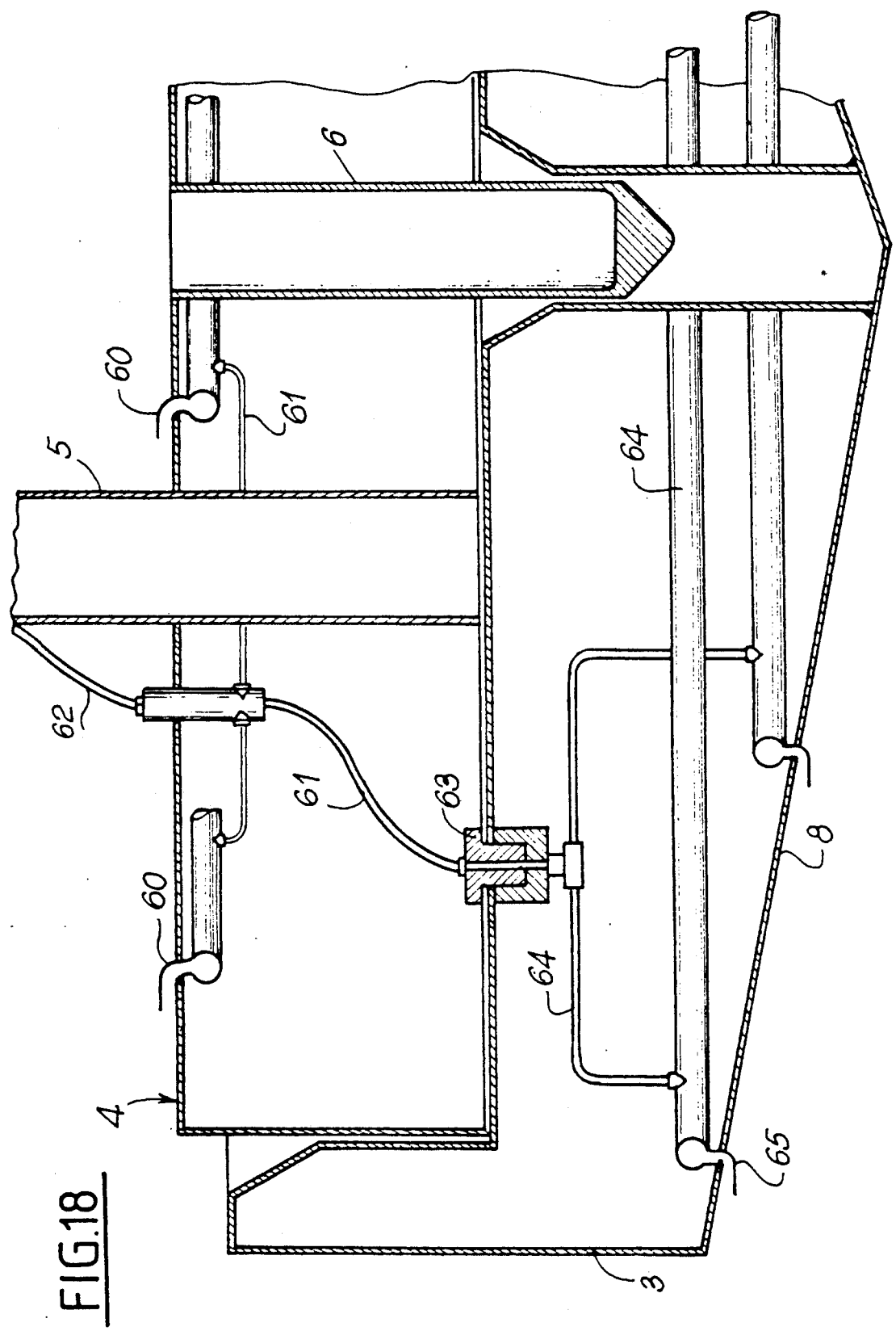
FIG. 18 is a schematic view of a pressurized gas ejection system for detaching the shoe from the sea bed.

As can be seen from FIG. 18, the upper wall of the foot 4 includes tubes 60 connected by a pipe-line system 61 to a main pressurized fluid supply pipe 62 fixed along the upright of the leg 5.

The lower wall of the foot 4 and the upper wall of the shoe 3 are provided with an automatic coupling 63 which connects the pipes 61 with the pipes 64 feeding the tubes 65 arranged in the lower wall of the shoe 3.

We claim:

1. A device for supporting the legs of a self-elevating oil-rig platform on the sea-bed, comprising:
    a shoe body, said shoe body including an upper plate for connection to the lower end of the leg of the oil-rig platform and a lower plate for resting on the sea-bed; and
    locking means operable between the leg of the oil-rig and said shoe body for detachably and adjustably rigidly fixing said shoe body to the lower end of the leg of the oil-rig platform;
    wherein said upper plate of said shoe body has a central housing defining a central opening in said upper plate and a plurality of peripheral housings angularly spaced about said central housing defining further openings;
    the leg of the oil-rig platform has a foot portion having a centering stud thereon for receipt in said central opening in said upper plate of said shoe body; and
    said locking means comprises a lock rod on the leg of the oil-rig platform for each said peripheral housing for receipt in respective said peripheral housings to immobilize said shoe body relative to the foot of the oil-rig platform.

2. The device as set forth in claim 1, wherein:
    each said lock rod of said locking means is vertically movably disposed for movement between locking and unlocking positions and has a plurality of catches thereon; and
    each said peripheral housing has a projection thereon such that said catches can engage with said projections in said locking position.

3. The device as set forth in claim 2, wherein:
    said catches are pivotably mounted on their respective said lock rod; and
    a spring biases each said catch from a retracted position toward a position wherein said catch is moved away from said lock rod.

4. The device as set forth in claim 2, wherein:
    said locking means further comprises a socket movably mounted on the lower end of each said lock rod for holding said catches in a retracted position and for supporting said lock rod.

5. The device as set forth in claim 2, wherein:
    said locking means further comprises a flange member at the upper end of said lock rod and a plurality of wedge blocks disposed about each said lock rod for engaging said flange member to hold said lock rod in its locking position when said catches engage with said projection on said peripheral housing.

6. The device as set forth in claim 5, wherein:
    said locking means further comprises control means for moving said wedge blocks in a direction perpendicular to the axis of said lock rod.

7. A device for supporting the legs of a self-elevating oil-rig platform on the sea-bed, comprising:
    a shoe body, said shoe body including an upper plate for connection to the lower end of the leg of the oil-rig platform and a lower plate for resting on the sea-bed; and
    locking means operable between the leg of the oil-rig and said shoe body for detachably and adjustably rigidly fixing said shoe body to the lower end of the leg of the oil-rig platform;
    wherein said upper plate of shoe body has a central housing defining a central opening in said upper plate;
    the leg of the oil-rig platform has a foot portion having a centering stud thereon for receipt in said central opening in said upper plate of said shoe body; and
    said locking means comprises a plurality of blocking devices on the foot portion of the leg of the oil-rig platform and a plurality of lock rods for cooperation with respective said blocking devices angularly distributed about said central opening in said upper plate of said shoe body.

8. The device as set forth in claim 7, wherein:
    said locking means further comprises control means for vertically moving each said lock rod between a locked position and an unlocked position.

9. The device as set forth in claim 8, wherein:
    said control means comprises a substantially thin jack having a relatively small range of movement.

10. The device as set forth in claim 8, wherein:
    each said lock rod has a rib portion extending across the upper end thereof for engagement with said blocking device.

11. The device as set forth in claim 10, wherein:
    each said blocking device is a rotatably mounted nut having an aperture shaped complementary to said rib portion of said lock rod allowing said rib portion to pass through said nut and an indentation oriented at a 90° angle with respect to said aperture, said indentation also shaped complementary to said rib portion for engagement therewith.

12. The device as set forth in claim 11, wherein:

said nut has notches spaced about its outer edge; and a chain is connected to said notches, a pinion is connected to said chain, a worm-pinion is connected to said pinion and a motor-reducer is connected to said worm-pinion, whereby said nut can be rotated.

13. A device for supporting the legs of a self-elevating oil-rig platform on the sea-bed, comprising:

a shoe body, said shoe body including an upper plate for connection to the lower end of the leg of the oil-rig platform and a lower plate for resting on the sea-bed;

locking means operable between the leg of the oil-rig and said shoe body for detachably and adjustably rigidly fixing said shoe body to the lower end of the leg of the oil-rig platform; and a pressurized fluid ejection system on the lower end of the leg of the oil-rig platform and on said shoe body, for assisting release of said shoe body and the lower end of the leg from the sea-bed, said system comprising a plurality of pressure fluid conduits extending through said shoe body and the lower end of the leg of the oil-rig platform.

14. A self-elevating oil-rig platform, comprising:

a plurality of legs, each leg having a foot portion at the lower end thereof;

a platform movable along said legs and lockable in position along said legs; and a device fitted to each said leg for supporting said legs on the sea-bed, said device comprising:

a shoe body, said shoe body including an upper plate for connection to a respective said foot portion of a said leg, and a lower plate for resting on the sea-bed, and locking means operable between said leg and said shoe body for detachably and adjustably rigidly fixing said shoe body to said foot portion of said leg;

wherein said upper plate of said shoe body has a central housing defining a central opening in said upper plate and a plurality of peripheral housings angularly spaced about said central housing defining further openings;

wherein said foot portion of each said leg has a centering stud thereon for receipt in said central opening in said upper plate of said shoe body; and wherein said locking means comprises a lock rod on said leg for each said peripheral housing for receipt in respective said peripheral housings to immobilize said shoe body relative to the foot of the oil-rig platform.

15. A self-elevating oil-rig platform, comprising:

a plurality of legs, each leg having a foot portion at the lower end thereof;

a platform movable along said legs and lockable in position along said legs; and a device fitted to each said leg for supporting said legs on the sea-bed, said device comprising:

a shoe body, said shoe body including an upper plate for connection to a respective said foot portion of a said leg, and a lower plate for resting on the sea-bed, and locking means operable between said leg and said shoe body for detachably and adjustably rigidly fixing said shoe body to said foot portion of said leg;

wherein said upper plate of shoe body has a central housing defining a central opening in said upper plate;

wherein said foot portion of each said leg has a centering stud thereon for receipt in said central opening in said upper plate of said shoe body; and wherein said locking means comprises a plurality of blocking devices on said foot portion of said leg and a plurality of lock rods for cooperation with respective said blocking devices angularly distributed about said central opening in said upper plate of said shoe body.

* * * * *